US010246955B2

(12) United States Patent
Berthaud et al.

(10) Patent No.: US 10,246,955 B2
(45) Date of Patent: Apr. 2, 2019

(54) SELF-ALIGNING MUD PUMP ASSEMBLY

(71) Applicant: Cameron International Corporation, Houston, TX (US)

(72) Inventors: Pascal Berthaud, Lespignan (FR); Robert Berthaud, Toulouse (FR)

(73) Assignee: Cameron International Corporation, Houston, TX (US)

( * ) Notice: Subject to any disclaimer, the term of this patent is extended or adjusted under 35 U.S.C. 154(b) by 325 days.

(21) Appl. No.: 15/227,807

(22) Filed: Aug. 3, 2016

(65) Prior Publication Data

US 2018/0010404 A1 Jan. 11, 2018

(30) Foreign Application Priority Data

Jul. 7, 2016 (EP) ...................................... 16305858

(51) Int. Cl.
*E21B 21/01* (2006.01)
*F04B 19/22* (2006.01)
(Continued)

(52) U.S. Cl.
CPC ............... *E21B 21/01* (2013.01); *F04B 1/00* (2013.01); *F04B 9/02* (2013.01); *F04B 15/02* (2013.01);
(Continued)

(58) Field of Classification Search
CPC .... E21B 21/01; F04B 1/00; F04B 9/02; F04B 15/02; F04B 19/22; F04B 23/06;
(Continued)

(56) References Cited

U.S. PATENT DOCUMENTS 2,930,641 A * 3/1960 Storey ................. F04B 39/0022
403/114
3,248,776 A * 5/1966 Brewster ............. F16C 11/0614
29/441.1
(Continued)

FOREIGN PATENT DOCUMENTS

DE 102008010286 A1 8/2009
DE 202013105650 U1 1/2014
(Continued)

OTHER PUBLICATIONS

White, "The Modern Mud Pump," reprinted from Upstream Pumping Solutions, Spring 2010 issue, pp. 1-4.
(Continued)

*Primary Examiner* — Zakaria Elahmadi
(74) *Attorney, Agent, or Firm* — Helene Raybaud

(57) ABSTRACT

A self-aligning mud pump apparatus is provided. In one embodiment, the mud pump includes a rotatable crankshaft, a crosshead, a crosshead guide, and a hub disposed in a housing. The hub is disposed on the crankshaft and is operable to convert rotating motion of the crankshaft to reciprocating motion of the crosshead within the crosshead guide. The hub is coupled to the crosshead via a connecting rod, which is connected the crosshead such that the connecting rod has five degrees of freedom with respect to the crosshead guide. The mud pump may also or instead include a piston coupled to the crosshead with five degrees of freedom between the piston and the crosshead. Additional systems, devices, and methods are also disclosed.

6 Claims, 17 Drawing Sheets

(51) Int. Cl.

| | | |
|---|---|---|
| *F04B 49/035* | (2006.01) | |
| *F04B 53/04* | (2006.01) | |
| *F04B 53/08* | (2006.01) | |
| *F04B 53/14* | (2006.01) | |
| *F04B 53/18* | (2006.01) | |
| *F16C 5/00* | (2006.01) | |
| *F04B 1/00* | (2006.01) | |
| *F04B 9/02* | (2006.01) | |
| *F04B 15/02* | (2006.01) | |
| *F04B 23/06* | (2006.01) | |
| *F16C 11/06* | (2006.01) | |
| *F16C 7/02* | (2006.01) | |

(52) U.S. Cl.
CPC .............. *F04B 19/22* (2013.01); *F04B 23/06* (2013.01); *F04B 49/035* (2013.01); *F04B 53/04* (2013.01); *F04B 53/08* (2013.01); *F04B 53/14* (2013.01); *F04B 53/143* (2013.01); *F04B 53/18* (2013.01); *F16C 5/00* (2013.01); *F16C 11/0614* (2013.01); *F16C 11/0628* (2013.01); *F05B 2230/60* (2013.01); *F16C 7/023* (2013.01); *F16C 2360/42* (2013.01)

(58) Field of Classification Search
CPC ........ F04B 49/035; F04B 53/04; F04B 53/08; F04B 53/14; F04B 53/143; F04B 53/18; F16C 5/00; F16C 11/0614; F16C 11/0628
See application file for complete search history.

(56) References Cited

U.S. PATENT DOCUMENTS

| | | | | |
|---|---|---|---|---|
| 3,276,390 | A * | 10/1966 | Bloudoff | F04B 53/14 417/319 |
| 3,394,633 | A * | 7/1968 | Payne | F25B 9/06 123/193.1 |
| 3,589,756 | A * | 6/1971 | Pruvot | F04B 1/124 403/124 |
| 3,785,444 | A * | 1/1974 | Gray | E21B 6/00 173/104 |
| 3,900,294 | A * | 8/1975 | McCloskey | B23P 15/003 29/434 |
| 4,174,194 | A * | 11/1979 | Hammelmann | F04B 19/022 417/457 |
| 4,202,082 | A * | 5/1980 | Williams | B21D 53/84 29/898.051 |
| 4,317,409 | A | 3/1982 | Bottoms | |
| 4,380,951 | A | 4/1983 | Bottoms | |
| 4,541,779 | A | 9/1985 | Birdwell | |
| 4,719,844 | A | 1/1988 | Dugan | |
| 4,977,817 | A | 12/1990 | Doman | |
| 5,114,261 | A * | 5/1992 | Sugimoto | F04B 1/2014 403/122 |
| 5,247,873 | A * | 9/1993 | Owens | F16C 5/00 384/11 |
| 5,778,759 | A * | 7/1998 | Johnson | F16J 1/12 92/129 |
| 5,823,093 | A | 10/1998 | Kugelev et al. | |
| 6,164,188 | A * | 12/2000 | Miser | F04B 53/14 403/14 |
| 7,540,809 | B2 * | 6/2009 | Costain | A63D 15/08 403/296 |
| 7,601,071 | B2 * | 10/2009 | Costain | A63D 15/08 473/44 |
| 7,610,847 | B2 * | 11/2009 | McKelroy | F04B 53/144 92/140 |
| 8,083,504 | B2 | 12/2011 | Williams et al. | |
| 8,696,324 | B2 | 4/2014 | Williams | |
| 8,833,802 | B2 * | 9/2014 | Morris | F16L 27/053 285/261 |
| 2007/0041849 | A1 * | 2/2007 | Allen | F04B 9/02 417/273 |
| 2008/0267785 | A1 * | 10/2008 | Cervenka | F04B 9/02 417/50 |
| 2009/0092510 | A1 * | 4/2009 | Williams | F04B 1/00 417/521 |
| 2010/0242720 | A1 * | 9/2010 | Matzner | F04B 53/147 92/139 |
| 2010/0275774 | A1 * | 11/2010 | Clemens | F04B 53/146 92/187 |
| 2010/0329905 | A1 | 12/2010 | Williams | |
| 2012/0201706 | A1 * | 8/2012 | Liu | F04B 1/122 417/510 |
| 2012/0315167 | A1 | 12/2012 | Williams | |
| 2013/0118424 | A1 * | 5/2013 | Street | F04B 15/08 123/41.35 |
| 2013/0195701 | A1 * | 8/2013 | Skurdalsvold | F04B 1/00 417/521 |
| 2014/0064996 | A1 | 3/2014 | Arima | |
| 2016/0025082 | A1 * | 1/2016 | Byrne | F04B 7/0069 417/515 |
| 2017/0082103 | A1 * | 3/2017 | Morreale | F04B 39/10 |
| 2017/0363250 | A1 * | 12/2017 | Gormley | F16M 13/02 |
| 2018/0087503 | A1 * | 3/2018 | Chunn | F04B 53/143 |

FOREIGN PATENT DOCUMENTS

| | | |
|---|---|---|
| EP | 0318182 A2 | 5/1989 |
| EP | 0393770 A1 | 10/1990 |
| EP | 2025937 A1 | 2/2009 |
| WO | 0031414 A2 | 6/2000 |
| WO | 2008132514 A1 | 11/2008 |
| WO | 2011143746 A1 | 11/2011 |

OTHER PUBLICATIONS

"Mud Pumps" brochure, sixteen pages, published by Cameron International Corporation, Houston, Texas, dated Apr. 2014.

"Quatro Quadraplex Mud Pump" brochure, three pages, published by White Star Pump Company, Waller, Texas, undated (downloaded Mar. 16, 2016, last accessed Aug. 5, 2016, via http://www.whitestarpump.com/docs/White%20Star%20Quatro%20Brochure.pdf).

Berthaud et al., U.S. Appl. No. 15/227,785, filed Aug. 3, 2016.
Berthaud et al., U.S. Appl. No. 15/227,795, filed Aug. 3, 2016.

* cited by examiner

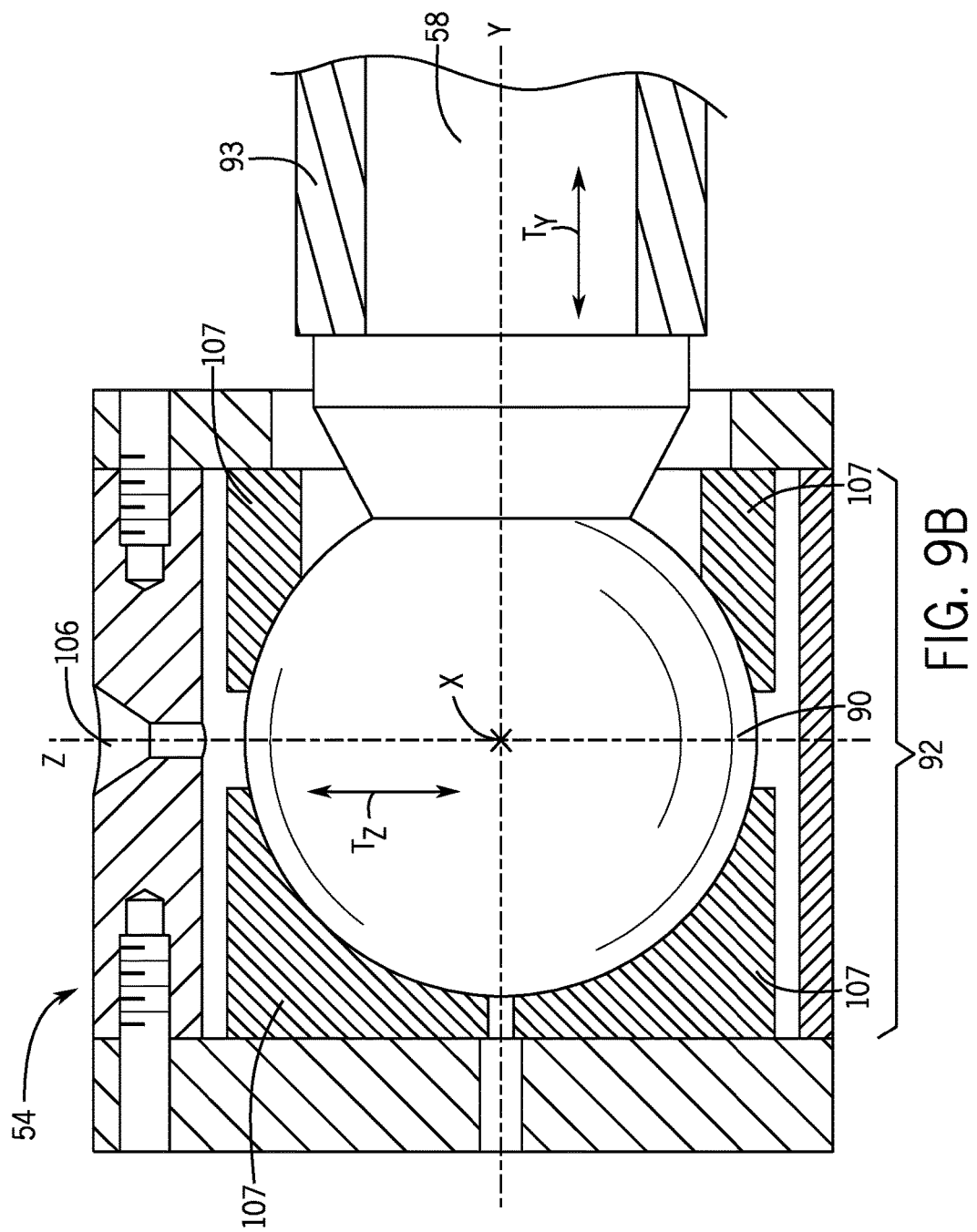

SELF-ALIGNING MUD PUMP ASSEMBLY

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource. Further, such systems generally include a wellhead assembly mounted on a well through which the resource is accessed or extracted. These wellhead assemblies may include a wide variety of components, such as various casings, valves, pumps, fluid conduits, and the like, that control drilling or extraction operations.

As will be appreciated, drilling and production operations employ fluids referred to as mud or drilling fluids to provide lubrication and cooling of the drill bit, clear away cuttings, and maintain desired hydrostatic pressure during operations. Mud can include all types of water-based, oil-based, or synthetic-based drilling fluids. Mud pumps can be used to move large quantities of mud from surface tanks, down thousands of feet of drill pipe, out nozzles in the bit, back up the annulus, and back to the tanks. Operations come to a halt if the mud pumps fail, and thus, reliability under harsh conditions, using all types of abrasive fluids, is of utmost commercial interest.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to a self-aligning mud pump apparatus. In one embodiment, the self-aligning mud pump apparatus includes a housing and a rotatable crankshaft disposed in the housing. The self-aligning mud pump apparatus can include a crosshead disposed in the housing, as well as a crosshead guide disposed in the housing to constrain movement of the crosshead. The self-aligning mud pump apparatus can include a hub disposed in the housing and disposed on the crankshaft for converting a rotating motion of the crankshaft to a reciprocating motion of the crosshead via a connecting rod having a first end coupled to the hub and a second end coupled to the crosshead. The connecting rod can be coupled to the crosshead such that the connecting rod has five degrees of freedom with respect to the crosshead guide.

Certain embodiments of the present disclosure generally relate to a method for assembling self-aligning components of a pump. The method can include providing a crosshead of the pump and coupling a connecting rod to the crosshead with a first socket joint that allows three rotational degrees of freedom between the connecting rod and the crosshead. The method can also include coupling a piston to the crosshead with a second socket joint that allows three rotational degrees of freedom between the piston and the crosshead.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 9B is a section view of the crosshead and piston of FIG. 9A, in accordance with one or more implementations described herein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

The present disclosure describes a variety of design changes to mud pump kinematics and construction to result in a less rigid, more robust and reliable mud pump. In a first embodiment described in greater detail below, load balancing is achieved by spacing hubs along the crankshaft of the mud pump with the bull gears disposed opposite one another, on the outermost ends of the crankshaft adjacent to the housing. In such an embodiment, the hubs are disposed along the crankshaft between the bull gears. In a second embodiment described in greater detail below, a novel crosshead design enables connection to both connecting rod and piston, resulting in self-aligning components with at least three degrees of rotational freedom and two degrees of translational freedom. In a third embodiment described in greater detail below, the present disclosure also includes various seal and/or piston sleeve assemblies that can be applied to a plunger style piston.

Figure 1:
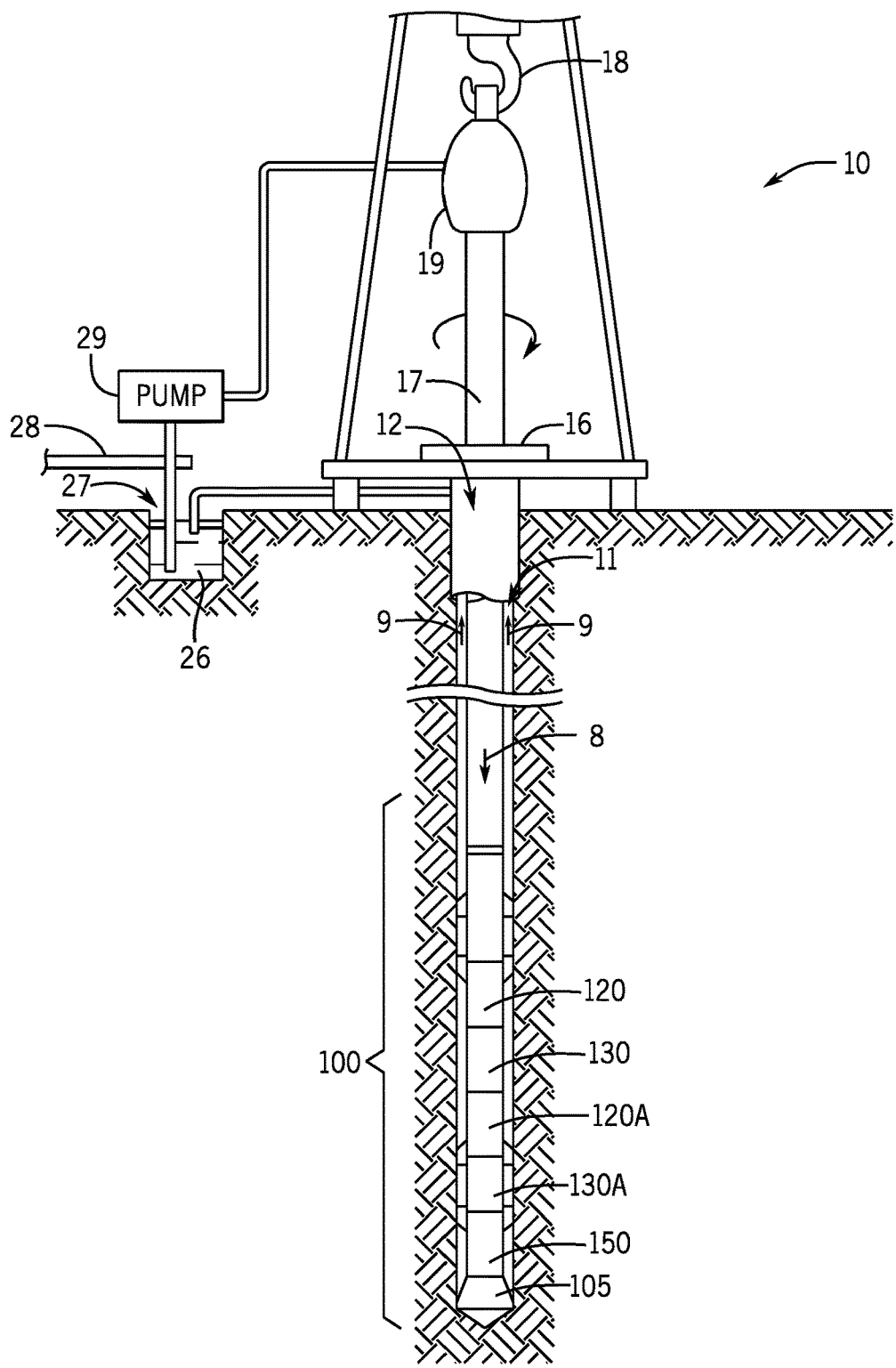
FIG. 1 generally depicts a wellsite system, in accordance with one or more implementations described herein.

Generally speaking, FIG. 1 illustrates a wellsite system in which the disclosed mud pump can be employed. The wellsite system of FIG. 1 may be onshore or offshore. In the wellsite system of FIG. 1, a borehole 11 may be formed in subsurface formations by rotary drilling using any suitable technique. A drill string 12 may be suspended within the borehole 11 and may have a bottom hole assembly 100 that includes a drill bit 105 at its lower end. A surface system of the wellsite system of FIG. 1 may include a platform and derrick assembly 10 positioned over the borehole 11, the platform and derrick assembly 10 including a rotary table 16, kelly 17, hook 18 and rotary swivel 19. The drill string 12 may be rotated by the rotary table 16, energized by any suitable means, which engages the kelly 17 at the upper end of the drill string 12. The drill string 12 may be suspended from the hook 18, attached to a traveling block (not shown), through the kelly 17 and the rotary swivel 19, which permits rotation of the drill string 12 relative to the hook 18. A top drive system could alternatively be used, which may be a top drive system well known to those of ordinary skill in the art.

In the wellsite system of FIG. 1, the surface system may also include drilling fluid 26 (also referred to as mud) stored in a pit/tank 27 at the wellsite. A pump 29 supported on a skid 28 may deliver the drilling fluid 26 to the interior of the drill string 12 via a port in the swivel 19, causing the drilling fluid to flow downwardly through the drill string 12 as indicated by the directional arrow 8. The drilling fluid 26 may exit the drill string 12 via ports in a drill bit 105, and circulate upwardly through the annulus region between the outside of the drill string 12 and the wall of the borehole 11, as indicated by the directional arrows 9. In this manner, the drilling fluid 26 lubricates the drill bit 105 and carries formation cuttings up to the surface, as the drilling fluid 26 is returned to the pit/tank 27 for recirculation. The drilling fluid 26 also serves to maintain hydrostatic pressure and prevent well collapse. The drilling fluid 26 may also be used for telemetry purposes. A bottom hole assembly 100 of the wellsite system of FIG. 1 may include logging-while-drilling (LWD) modules 120 and 120A and/or measuring-while-drilling (MWD) modules 130 and 130A, a roto-steerable system and motor 150, and the drill bit 105.

Figure 2:
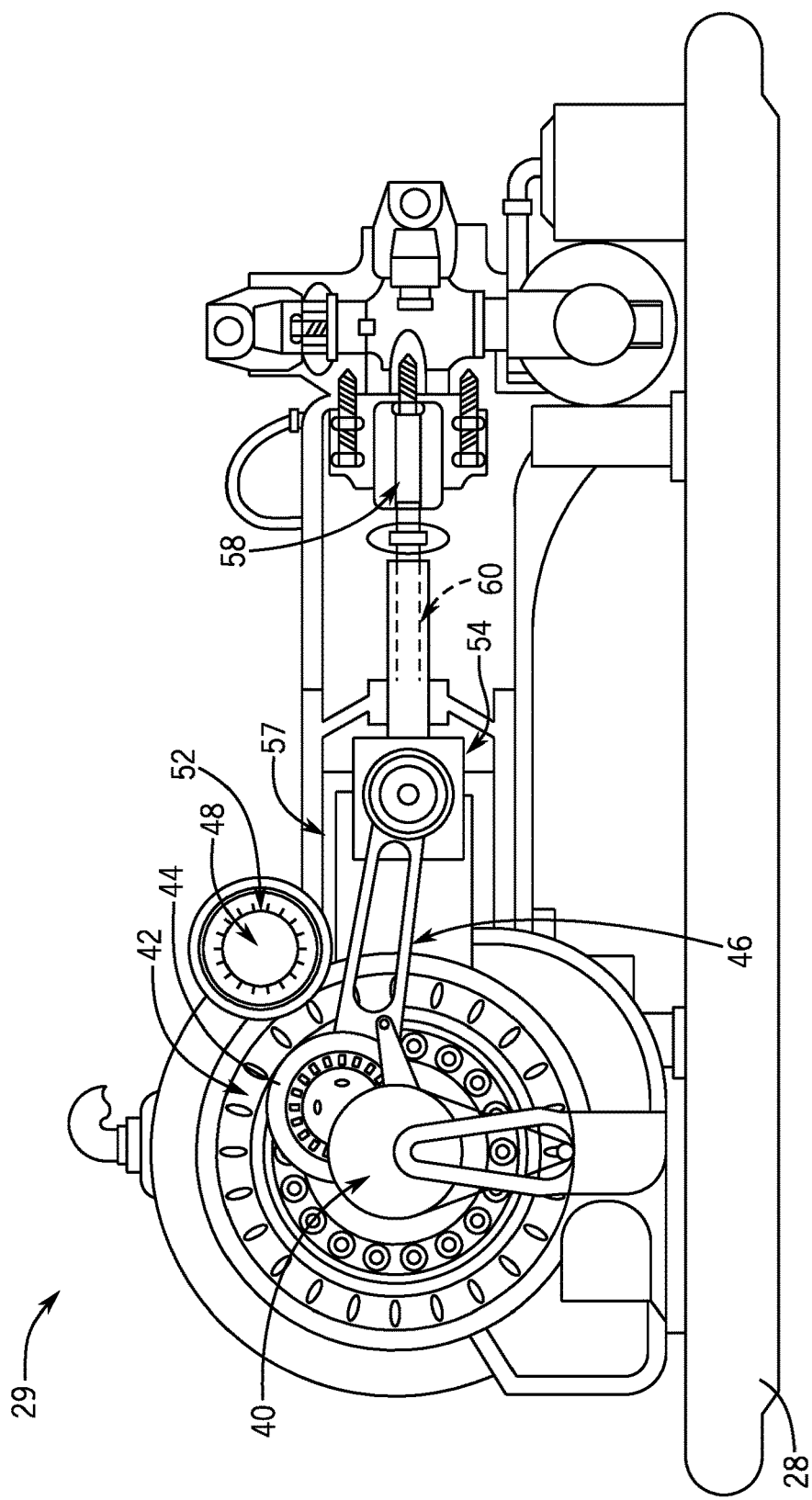
FIG. 2 shows a side cutaway view of a prior art pump.

FIG. 2 shows a cutaway side view of a prior art mud pump, illustrating various components of the power assembly, the portion of the pump that converts rotational energy into reciprocating motion. A pump as shown in FIG. 2 could be used as pump 29 of FIG. 1, although many other mud pumps, including those with designs described below in accordance with certain embodiments of the present technique, could instead be used as pump 29. Pinion gears 52 along a pinion shaft 48 drive a larger gear referred to as a bull gear 42 (e.g., a helical gear or a herringbone gear), which rotates on a crankshaft 40. Pinion shaft 48 is turned by a motor (not shown). The crankshaft 40 turns to cause rotational motion of hubs 44 disposed on the crankshaft 40, each hub 44 being connected to or integrated with a connecting rod 46. By way of the connecting rods 46, the rotational motion of the crankshaft 40 (and hub 44 connected thereto) is converted into reciprocating motion. The connecting rods 46 couple to a crosshead 54 (a crosshead block and crosshead extension as shown may be referred to collectively as the crosshead 54 herein). The crosshead 54 moves translationally constrained by guide 57. Pony rods 60 connect the crosshead 54 to a piston 58. In the fluid end of the pump, each piston 58 reciprocates to move mud in and out of valves in the fluid end of the pump 29.

Using conventional mud pump designs, pumping drilling fluids at above 50% capacity and/or for longer periods of time accelerates pump failure. With any combination of the design changes described below implemented, a mud pump may be operable at a higher capacity for longer periods of time. The design changes disclosed herein include load balancing embodiments, self-aligning power assembly embodiments, and piston sealing implementations.

Figure 3:
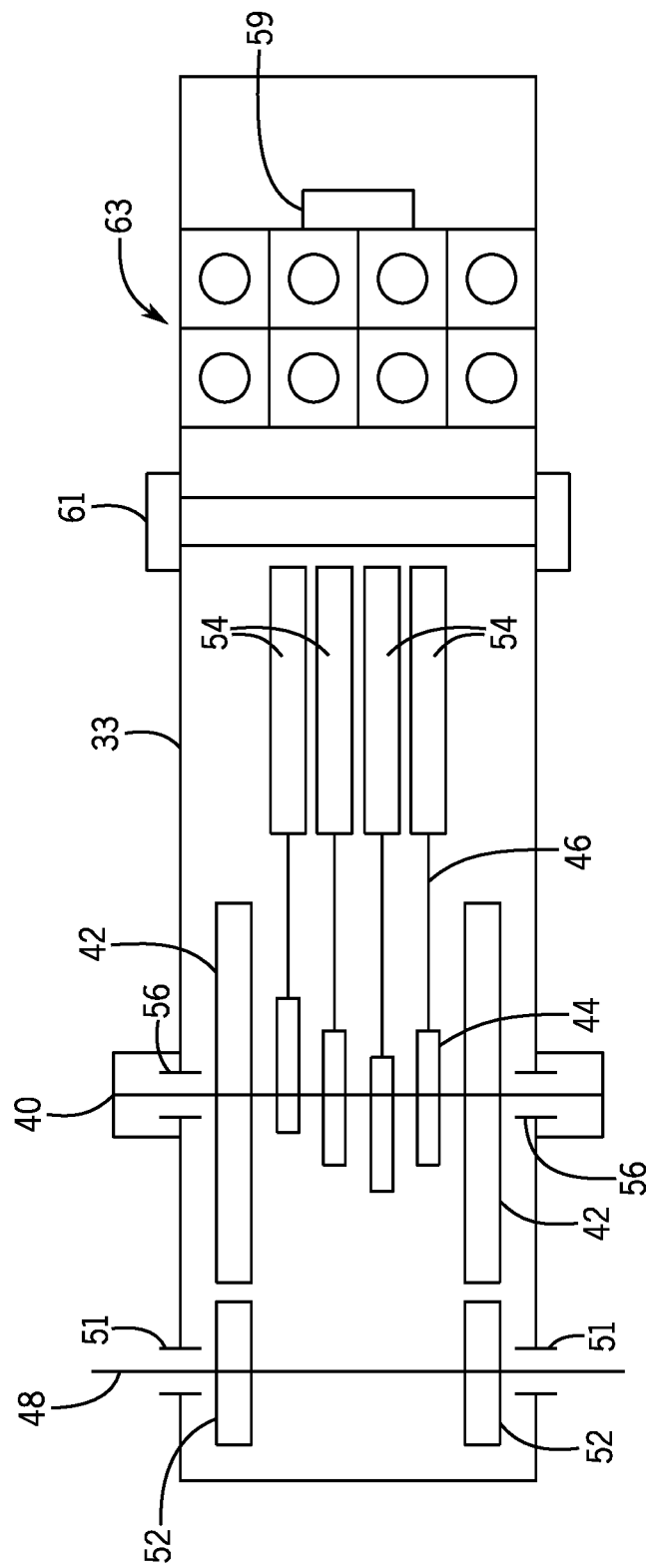
FIG. 3 shows a schematic of a mud pump in accordance with one or more implementations described herein.

Turning now to FIG. 3, a load-balanced mud pump is shown. Within a housing 33, a pinion shaft 48 is disposed, supported in roller bearings 51 at each opposing end of pinion shaft 48. Pinion shaft 48 is driven by a motor (not shown). A pair of pinion gears 52 rotate on the pinion shaft 48. Pinion gears 52 engage with bull gears 42, each of which rotate on a crankshaft 40. As can be seen in FIG. 3, the bull gears 42 are positioned adjacent to the housing 33 along the crankshaft 40, and pinion gears 52 are likewise positioned adjacent to the housing 33 along the pinion shaft 48. A plurality of hubs 44 are positioned along the crankshaft 40 between the bull gears 42 without any hubs positioned between the bull gears 42 and the walls of the housing 33.

By separating the largest, heaviest gears, i.e., the bull gears 42, toward the exterior along the crankshaft, an optimized load balance is accomplished. The position of the pinion gears 52 being substantially toward the exterior along the pinion shaft 48 further contributes to the load balance of the pump overall. In other embodiments, pinion gears 42 and bull gears 52 may be positioned further away from the walls of the housing while still remaining closer to the walls of the housing than to a midpoint along the pinion shaft 48 and crankshaft 40 respectively.

Each hub 44 is integrated with a connecting rod 46 (typically a forged metal) that couples at an interface to a crosshead 54, which will be discussed in further detail below. In turn, each crosshead 54 also couples at another interface to a plunger piston 58 (shown in FIG. 9A). Crosshead 54 is constrained in direction of movement by a guide, not shown in FIG. 3, discussed further below. In the fluid end, plunger piston 58 draws mud in and out by way of inlet 59 and outlet 61. Valve pots 63 are the machine openings to the fluid end of the mud pump.

Figure 4A:
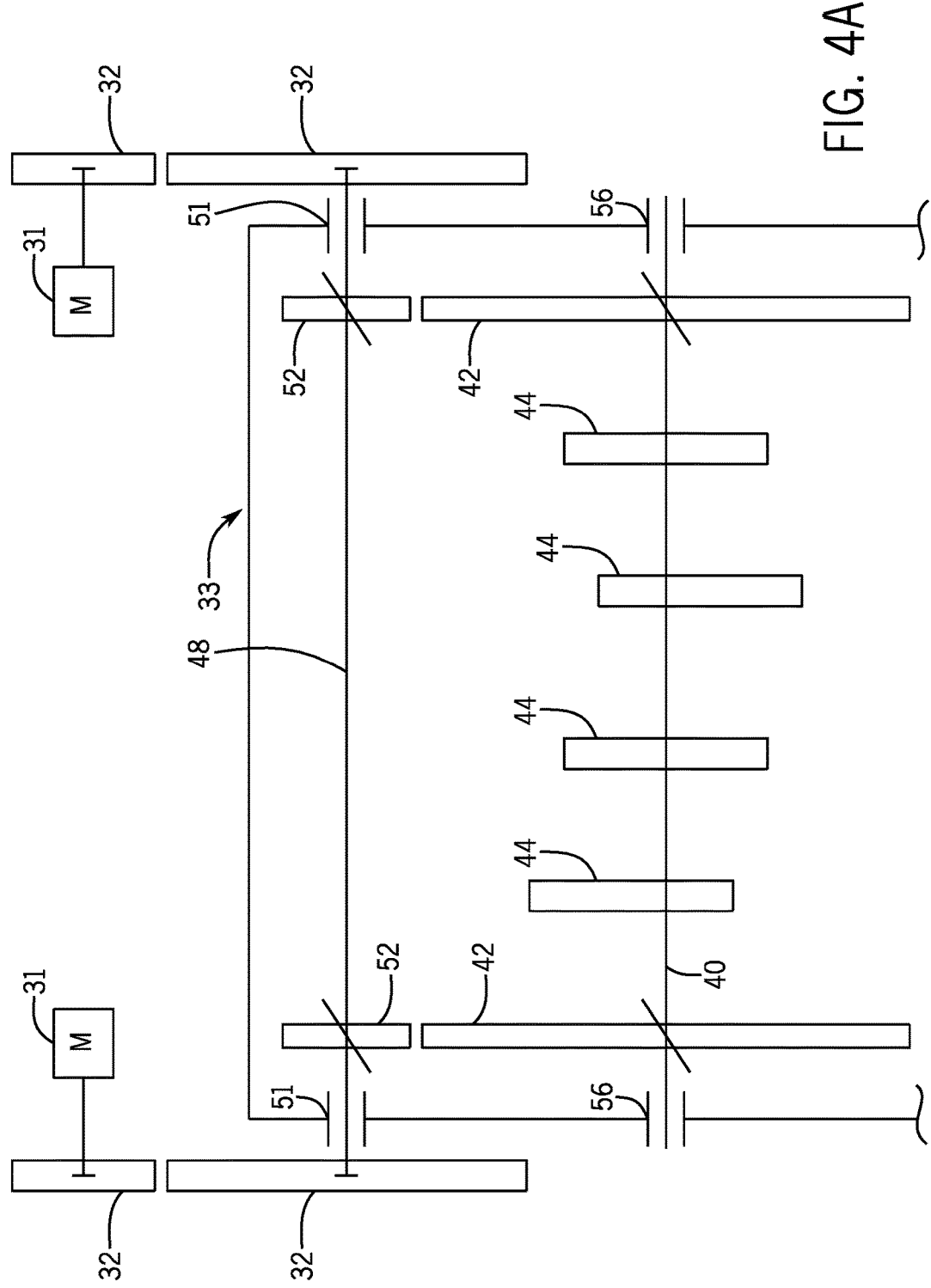
FIG. 4A shows a schematic of an alternative mud pump in accordance with one or more implementations described herein.

FIG. 4A shows a schematic of a mud pump in accordance with one or more implementations described herein. Motors 31 couple operatively to a series of gear wheels 32. The gear wheels 32 rotate the pinion shaft 48. Pinion shaft 48 is supported in the housing 33 by a pinion shaft roller bearing 51 in the wall of housing 33 at either end of the pinion shaft 48. The pinion gears 52 are rotatable on pinion shaft 48. Pinion gears 52 engage bull gears 42, which are rotatable on the crankshaft 40. Crankshaft 40 is supported in the housing 33 on crankshaft roller bearings 56 in the walls of housing 33 at either end of the crankshaft 40. Bull gears 42 are positioned along crankshaft 40 at opposite ends of the crankshaft 40, adjacent to the walls of housing 33. Hubs 44 are positioned along the crankshaft between the bull gears 42. In the embodiment shown, the hubs 44 are spaced about evenly across the crankshaft 40. The crankshaft 40 passes through not the center of each hub, but at a position radially offset from the center of each hub, such that the hubs 44 are out of phase relative to one another to drive the pistons. Alternatively, embodiments are envisioned in which spacing is optimized for load balancing based on the weight and/or size of each individual hub 44 and connecting rod 46. Additionally, four hubs 44 are shown in FIG. 4A, though pumps having as few as two, or as many as five, hubs for driving reciprocal motion of crossheads are likewise contemplated in the present disclosure.

Figure 4B:
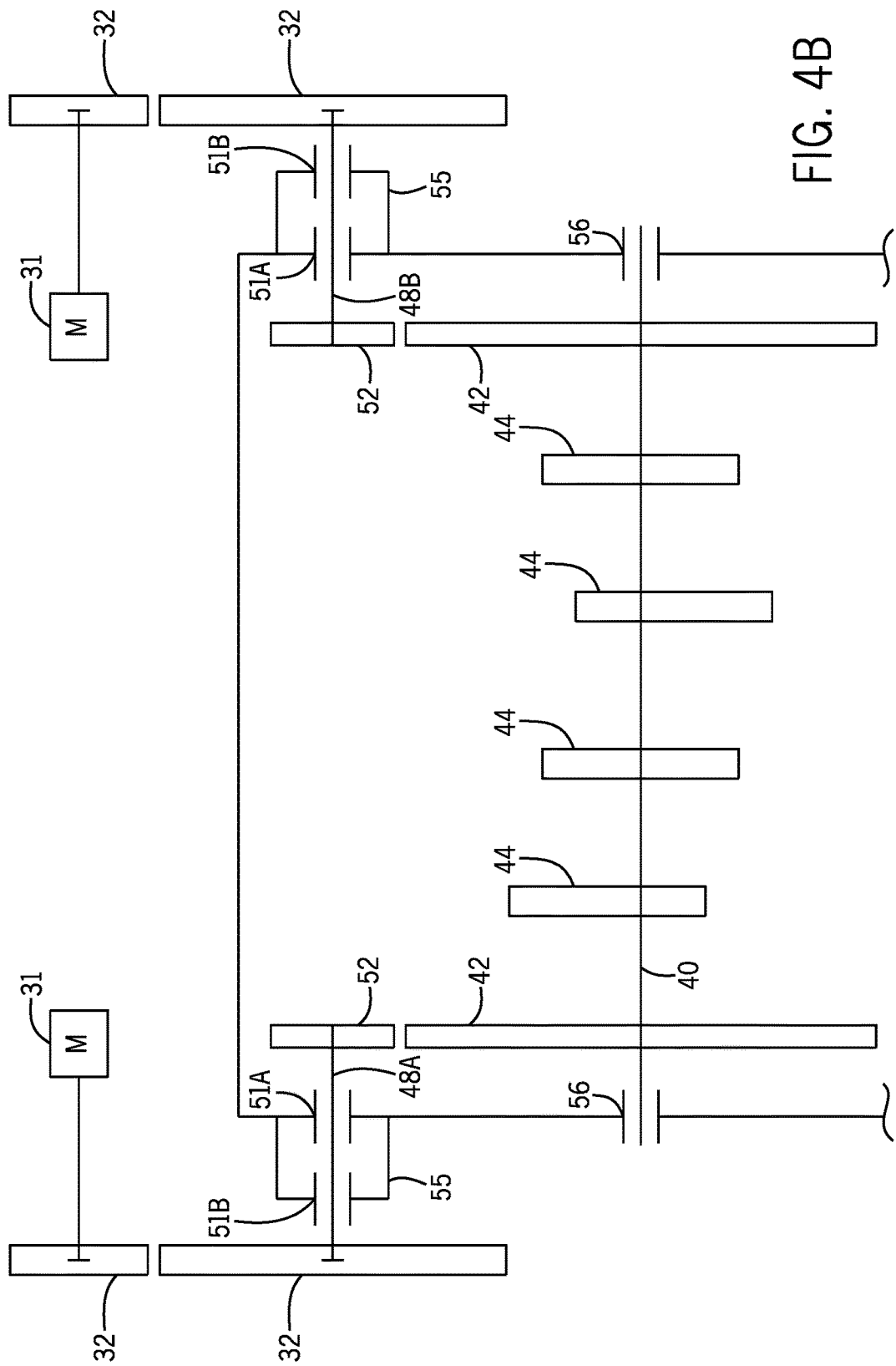
FIG. 4B shows a schematic of an alternative mud pump in accordance with one or more implementations described herein.

FIG. 4B shows a schematic of an alternative of a mud pump in accordance with one or more implementations described herein. Motors 31 couple operatively to a series of gear wheels 32. The gear wheels 32 rotate two separate pinion shafts, denoted pinion shafts 48A and 48B in FIG. 4B. Separate pinion shafts 48 enable easier repair of pump components, as there is sufficient room to, if needed, remove each pinion shaft independently. By comparison a single longer length pinion shaft may be of such a length as to be physically difficult to remove once the pump is rigged up in limited space at a wellsite. Pinion shafts 48 are supported in the housing 33 by at least a pair of pinion shaft roller bearings 51A and 51B in the wall of housing 33 on both sides of the housing 33. In order for each pinion shaft to rotate without wobbling under weight, at least two points of mechanical support are used. Thus, a mechanical support 55 affixed to (or integrated with) the housing 33 provides support to pairs of roller bearings 51A and 51B. A pinion gear 52 is rotatable on each separate pinion shaft 48. Pinion gears 52 engage bull gears 42, each of which is rotatable on the crankshaft 40. The positioning of the bull gears 42 and hubs 44 along the crankshaft 40 are, in FIG. 4B, similar to the configuration as described with respect to FIG. 4A.

Figure 4C:
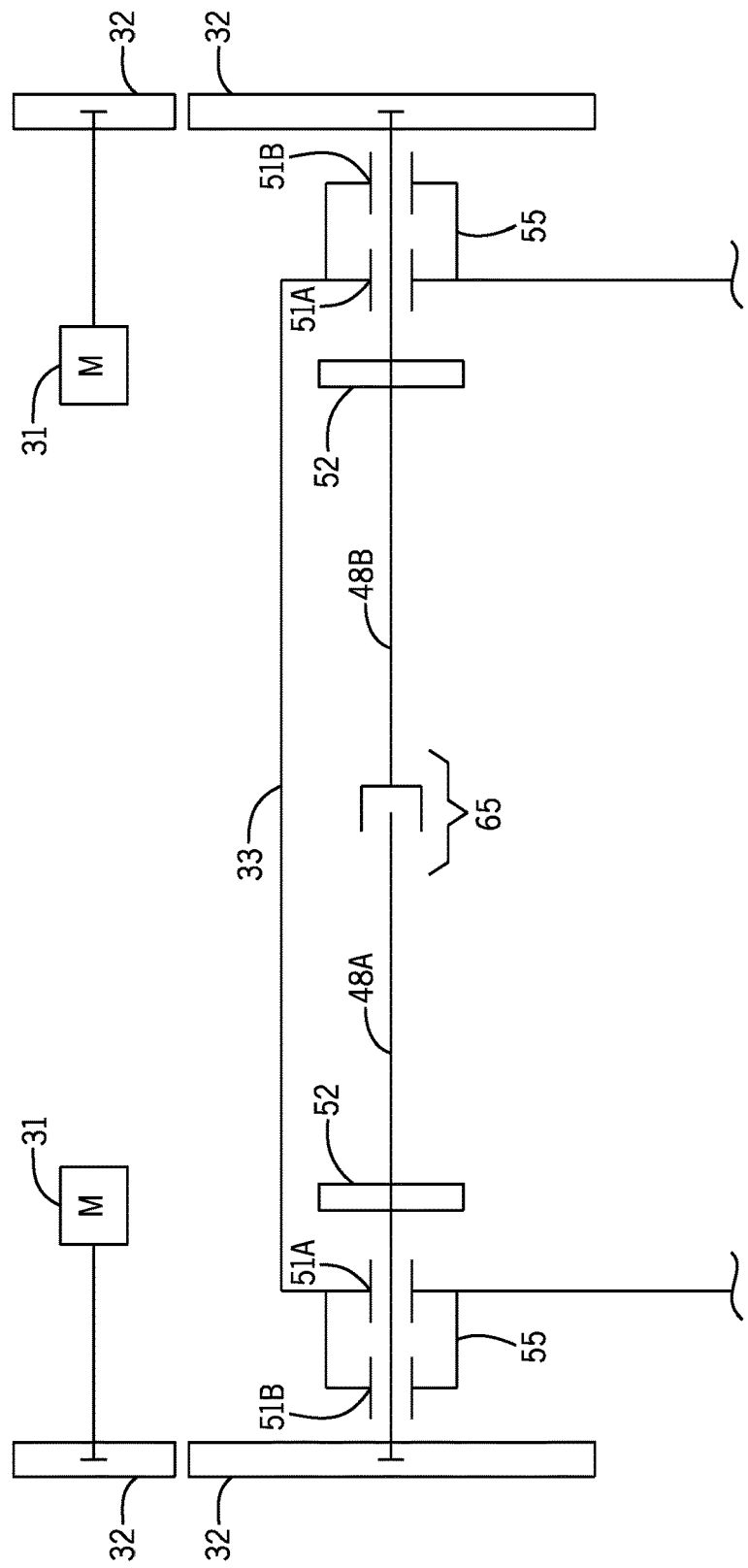
FIG. 4C shows a schematic of an alternative mud pump in accordance with one or more implementations described herein.

FIG. 4C shows a schematic of an alternative of a mud pump in accordance with one or more implementations described herein. Motors 31 couple operatively to a series of gear wheels 32. The gear wheels 32 rotate two separate pinion shafts 48 coupled together at a coupler 65. The coupler 65 serves two purposes. First, the coupler 65 mechanically fastens the two pinion shafts 48 to one another such that the length of the fastened pinion shafts 48 is mechanically supported. Second, the coupler 65 serves to synchronize rotation of pinion shafts 48A and 48B, allowing the pinion shafts 48A and 48B to be rotated with respect to one another during assembly for proper rotational phase difference between the hubs 44 of the two shafts to drive the pistons. By disconnecting the coupler 65, each pinion shaft 48 can be replaced independent of the other. Pinion shafts 48 are supported in the housing 33 by at least a pair of pinion shaft roller bearings, denoted 51A and 51B, in the wall of housing 33 on both sides of the housing 33. As above, in order for each pinion shaft to rotate without wobbling under weight, at least two points of mechanical support are used. Thus, mechanical support 55 affixed to (or integrated with) the housing 33 provides an anchoring point for pairs of roller bearings 51A and 51B to hold up each pinion shaft 48A and 48B. A pinion gear 52 is rotatable on each separate pinion shaft 48. Pinion gears 52 engage bull gears 42, each of which is rotatable on the crankshaft 40. The positioning of the bull gears 42 and hubs 44 along the crankshaft 40 are, in FIG. 4C, similar to the configuration as described with respect to FIG. 4A.

In embodiments employing two independent separate pinion shafts, as shown in FIGS. 4B and 4C, the two segments of the pinion shaft 48 are indirectly rotationally coupled one to the other through the first bull gear 42, the crankshaft 40, and the second bull gear 42, respectively. In such embodiments, the two segments of pinion shaft 48 do not directly engage one another.

Figure 5A:
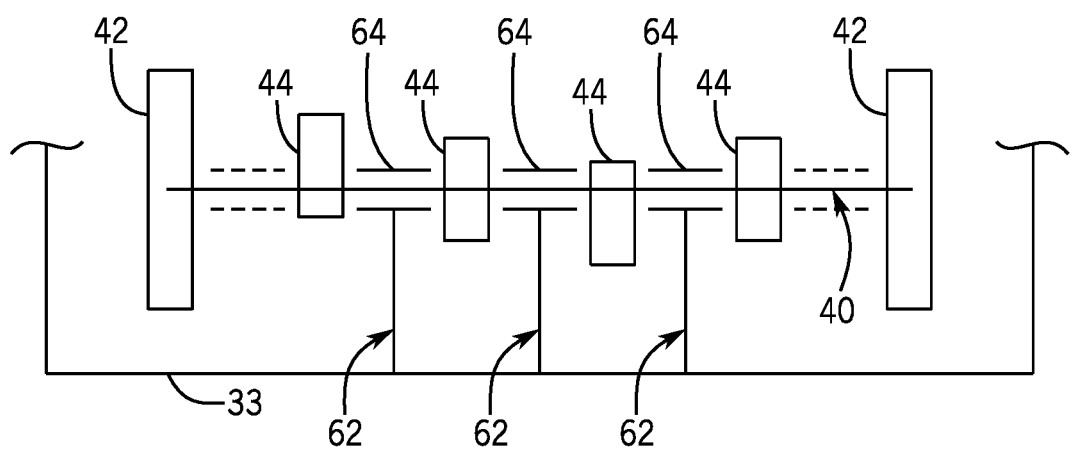
FIG. 5A shows a schematic of a crankshaft of a mud pump in accordance with one or more implementations described herein.
Figure 5B:
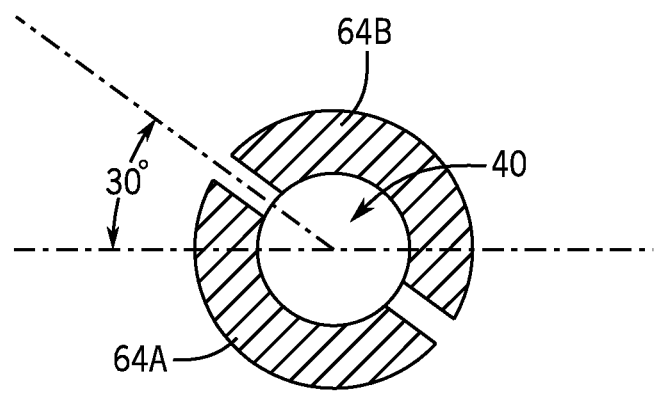
FIG. 5B shows a cross-section of a lubricated pad, as an alternative for a roller bearing, for use in conjunction with the crankshaft of FIG. 5A in accordance with one or more implementations described herein.

FIG. 5A shows a schematic of a crankshaft of a mud pump in accordance with one or more implementations described herein. The pinion shaft 48 and pinion gear 52 may be configured as in any of the embodiments described above. As can be seen in FIG. 5A, the bull gears 42 are positioned adjacent to the housing 33 along the crankshaft 40. Pinion gears 52 may likewise be positioned adjacent to the housing 33 along the pinion shaft 48. A plurality of hubs 44 are positioned along the crankshaft 40 between the bull gears 42. An optimized weight load balance is accomplished by separating the largest, heaviest gears, the bull gears 42. In the embodiment of FIG. 5A, the crankshaft 40 spans a length less than the width of the housing 33. In lieu of roller bearings 56 in the walls of the housing 33 to support the crankshaft 40, mechanical supports 62 are attached to (or integrated with) the housing 33 to support the crankshaft 40. Lubricated pads 64 affix to the mechanical supports 62 so that the crankshaft 40 rotates freely. FIG. 5B shows a cross-section of an example of a lubricated pad, as an alternative for a roller bearing, for use in the embodiment shown in FIG. 5A. The lubricated pad 64 may include a lower pad 64A and an upper pad 64B, each conformed to curve around crankshaft 40. In a preferred embodiment, the lubricated pads are offset by 30° relative to a horizontal plane running through the crankshaft 40, as shown. The surface of lower pad 64A and upper pad 64B are lubricated. Additional lubricant can be added to the surfaces in contact with the crankshaft 40 in the gap between lower pad 64A and upper pad 64B.

Figure 6A:
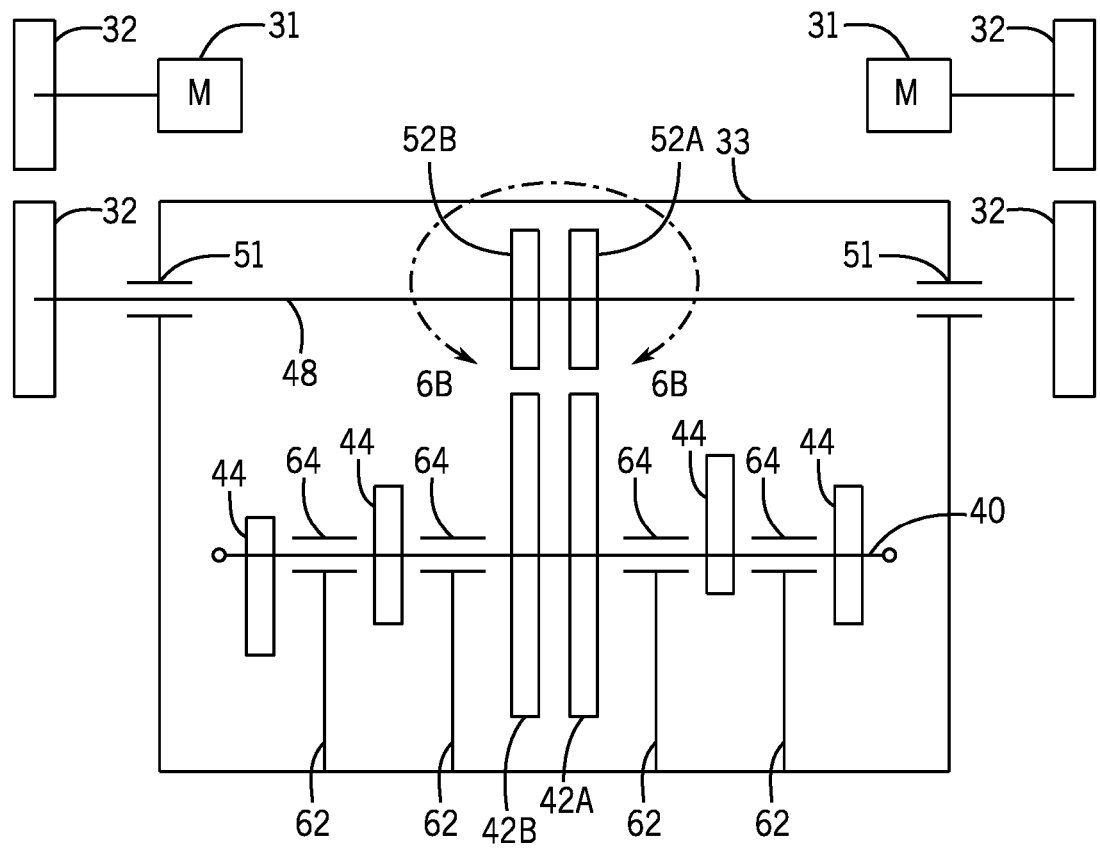
FIG. 6A shows a schematic of an alternative mud pump in accordance with one or more implementations described herein.
Figure 6B:
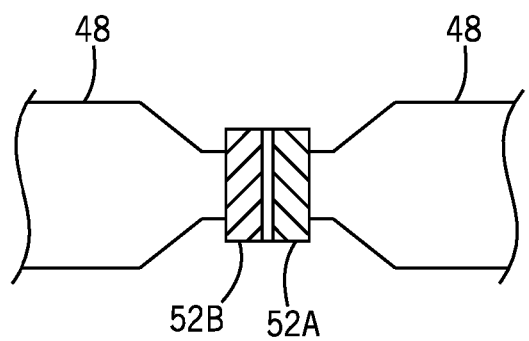
FIG. 6B shows a schematic of an alternative crankshaft of a mud pump such as shown in FIG. 6A in accordance with one or more implementations described herein.

FIG. 6A shows a schematic of an alternative of a mud pump in accordance with one or more implementations described herein. Load balancing is achieved in the embodiment of FIG. 6A by positioning the bull gears 42 adjacent to one another, centered on the crankshaft 40 and having none of the hubs 44 positioned on the crankshaft 40 therebetween. Motors 31 couple operatively to a series of gear wheels 32. The gear wheels 32 rotate pinion shaft 48. Pinion shaft 48 is supported in the housing 33 by pinion shaft roller bearings 51 in the walls of housing 33 on both sides of the housing 33. Pinion gears 52A and 52B are rotatable on pinion shaft 48, and are positioned adjacent to one another without engaging one another. The pinion gears 52A and 52B may be helical in design, as shown in FIG. 6B. Pinion gears 52 engage bull gears 42, each of which is rotatable on the crankshaft 40. In the embodiment of FIG. 6A, the crankshaft 40 spans a length less than the width of the housing 33. In lieu of roller bearings 56 in the walls of the housing 33 to support the crankshaft 40, mechanical supports 62 are attached to or integrated with the housing 33 to brace or support the crankshaft 40, and lubricated pads 64, such as those shown in FIG. 5B, affix to the mechanical supports 62 such that the crankshaft 40 rotates freely.

In the embodiment shown in FIG. 5A, four hubs 44 are shown, and three mechanical supports 62 are shown between the hubs 44. In the embodiment shown in FIG. 6A, four hubs 44 are shown and four mechanical supports 62 are shown. As with the previously described embodiments, pumps having as few as two, or as many as five, hubs are likewise contemplated in the present disclosure, along with a number of mechanical supports to adequately support the weight of the hubs 44 along the crankshaft 40, as can be readily determined by one of ordinary skill in the art.

Figure 6C:
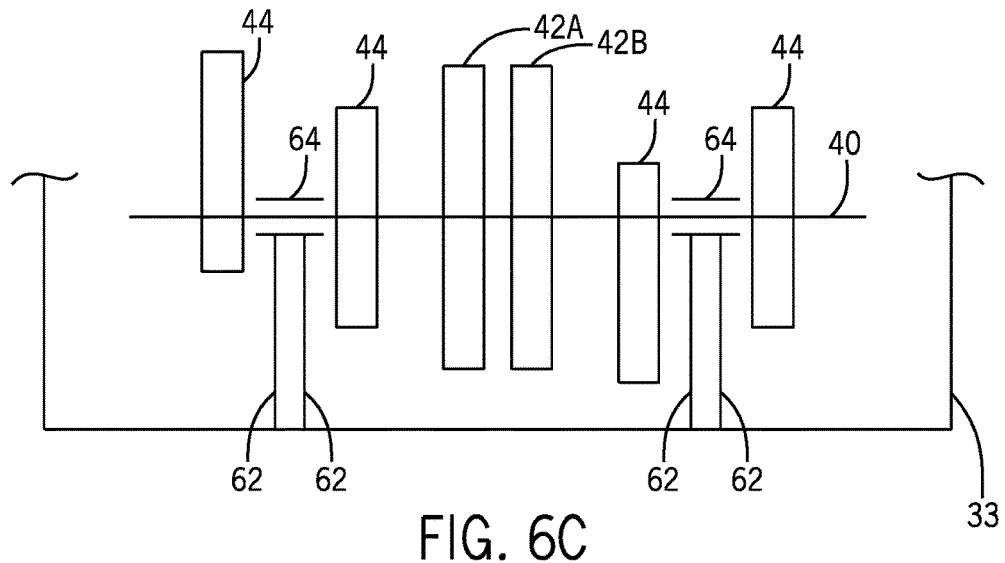
FIG. 6C shows a schematic of an alternative crankshaft of a mud pump such as shown in FIG. 6A in accordance with one or more implementations described herein.

FIG. 6C illustrates an alternative embodiment, having bull gears 42 centered along the crankshaft relative to the walls of the housing 33, with hubs 44 disposed along crankshaft 40 axially away from each of the bull gears 42. Mechanical supports 62 extend from the housing 33 to positions between hubs 44. Any numerical combination of hubs and mechanical supports is contemplated by the present disclosure, to the extent that the mechanical supports 62 adequately bear the load of the crankshaft bearing the bull gears 42 and hubs 44. The load is balanced across the length of the crankshaft so as to minimize wobble during high or full capacity usage of the pump.

Figure 7A:
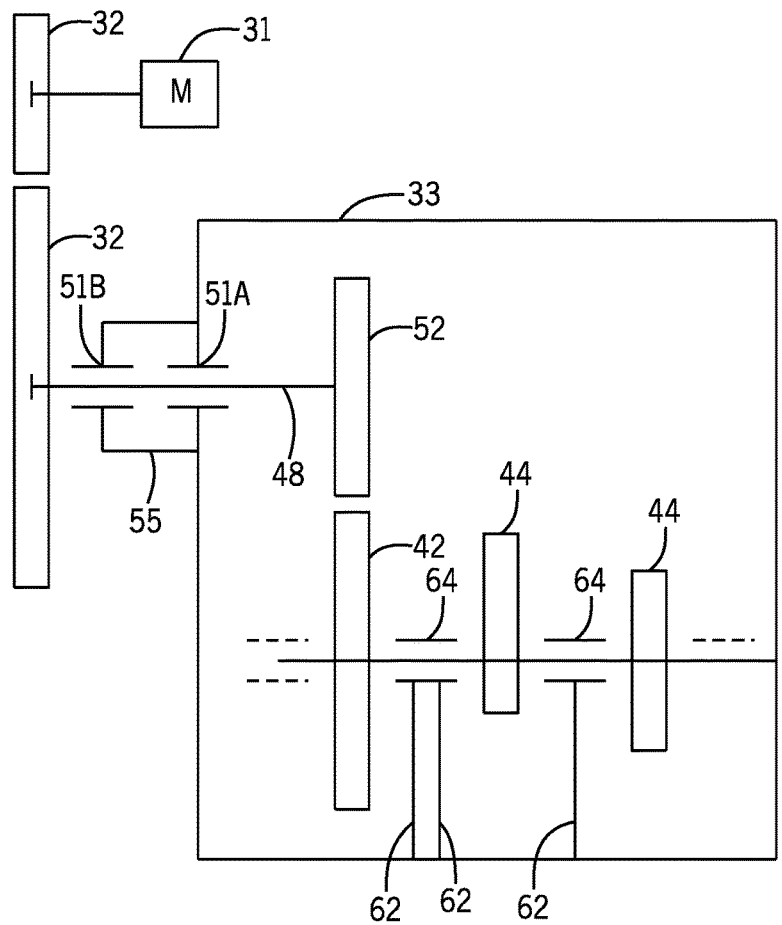
FIG. 7A shows a schematic of a modular mud pump unit that can be used alone or in combination with a mirror-image modular unit, as shown in FIG. 7B, in accordance with one or more implementations described herein.
Figure 7B:
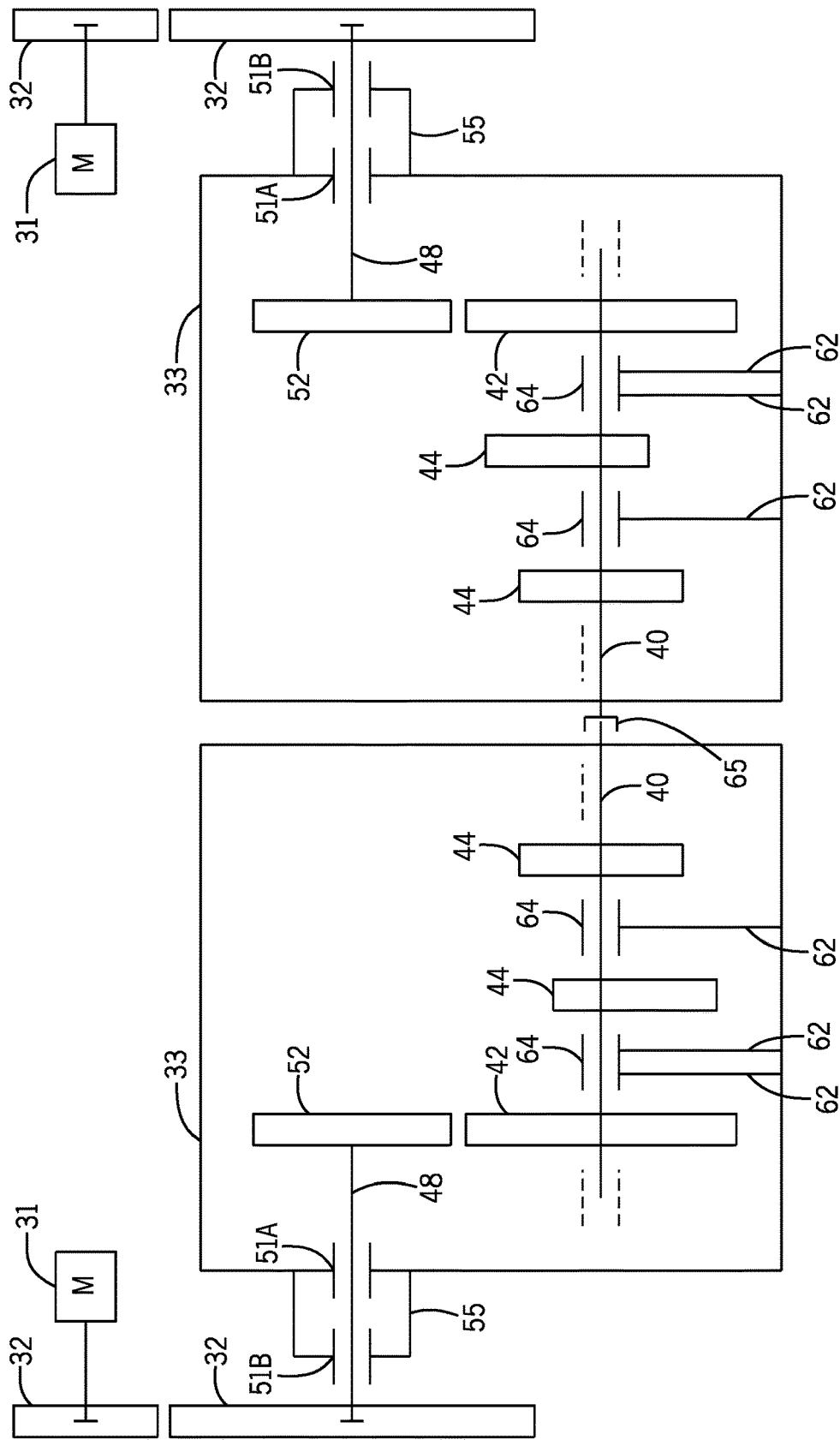

FIG. 7A shows a schematic of a modular unit that, when coupled with a mirror-image modular unit, is operable as a mud pump in accordance with one or more implementations described herein. By providing independent modules of mud pump power end components, the overall mud pump is scalable. Expensive downtime is reduced with quick repair by interchanging modules, should any component in one module fail. The interchangeable mud pump module shown in FIG. 7A is contained within a housing 33, and a mechanical support 55 is affixed to (or integrated with) the housing 33. A crankshaft 40 is disposed within the housing 33, and a pinion shaft 48 is disposed within the housing 33. A first end of the crankshaft is adapted to couple rotatably to a crankshaft of a second adjacent mud module (which would be coupled at the right side of FIG. 7A). The second end of the crankshaft is rotatably supported in the housing 33, such as by mechanical supports 62 having lubricated pads 64 about the crankshaft 40. As shown, the crankshaft 40 has a plurality of hubs 44 and a bull gear 42 disposed thereon. The bull gear 42 is positioned at the second end of the crankshaft adjacent the housing 33, opposite the end of the crankshaft 40 that is supported in the wall of the housing 33. The mud pump module can also include a rotatable pinion shaft 48 for driving the crankshaft 40. The pinion shaft 48 has disposed thereon a pinion gear 52 engaging the bull gear 42 on the crankshaft 40. When a module such as shown in FIG. 7A is coupled to another that is configured as a mirror image of the one shown in FIG. 7A (as seen in FIG. 7B), a scalable, load-balanced mud pump that is easily repaired is achieved. With a smaller footprint and less weight, substantially less effort is used in rig-up as well. FIG. 7B shows the crankshaft 40 of each module coupled together with a coupler 65. Coupler 65 serves to both provide mechanical strength where the coupler 65 fastens the two crankshafts 40 together, as well as serving to synchronize the rotation thereof, and allow rotation of the crankshafts relative to one another to position each of the hubs 44 properly out of phase with respect to one another for driving the pistons.

A further improvement upon the mud pump design addresses the overall rigidity of the components about the crosshead. When the connection of the connecting rod or piston to the crosshead is not in proper alignment, premature wear may occur on these components, leading to pump failure. By implementing the kinematics of the present disclosure, five degrees of freedom of movement between the connecting rod and the crosshead guide can be achieved: three degrees of rotational freedom and two degrees of translational freedom. Rather than a simple cylindrical pin to couple the connecting rod to the crosshead, the present disclosure envisions a crosshead as shown in FIGS. 8A and 8B having a pin 75A with a spherical main body 75B seated in a bearing to secure the connecting rod within the crosshead block.

Figure 8A:
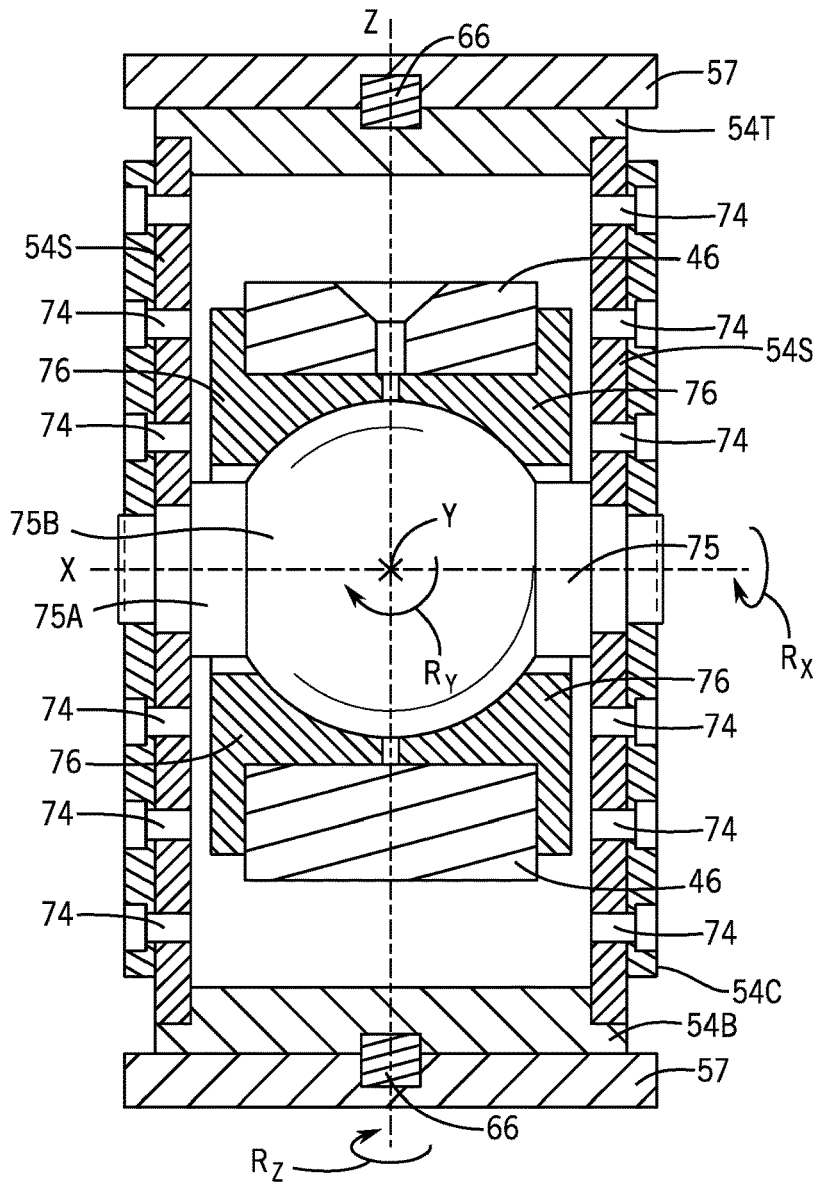
FIG. 8A shows a partial cross-section of a crosshead and connecting rod interface of a mud pump, in accordance with one or more implementations described herein.

FIG. 8A shows a cutaway cross-section of the crosshead and connecting rod interface, in accordance with one or more implementations described herein. In some instances, a crosshead comprises a block that the connecting rod end is inserted into or about, with the connecting rod held rigidly in place by a cylindrical pin through the connecting rod and crosshead. By comparison, the crosshead design of the present disclosure offers additional degrees of freedom of movement. Turning now to FIG. 8A, guides 57 hold the crosshead 54 in place for reciprocating motion. Crosshead 54 comprises a crosshead top 54T, a crosshead bottom 54B, and crosshead side plates 54S. Connecting rod 46 is inserted into the crosshead 54 and secured in place by a pin 75A having a spherical main body 75B. The spherical main body 75B may be integrated with a pin, or a sphere component may be placed about a cylindrical pin. The ends of pin 75A engage with crosshead side plates 54S to hold pin 75A in place while connecting rod 46 is engaged with the cross head 54. A two-piece bearing 76 fastened about the spherical main body 75B of pin 75A facilitates swiveling motion of the connecting rod 46 about the pin 75A. Crosshead side plates 54S secure in place via screws (or like fasteners) through holes 74 in crosshead side plates 54S after the connecting rod 46, bearing 76, and pin 75A are inserted in the crosshead 54. A brace plate 54C provides structural reinforcement to the pin 75A when secured in place to crosshead side plates 54S with fasteners through screw holes 74.

Pin 75A having a spherical main body 75B allows for rotational movement in the $R_X$, $R_Y$, and $R_Z$ directions (defined with Y-axis in the direction of reciprocal motion into the page), in that connecting rod 46 is free to move rotationally about the spherical main body 75B of the pin 75A. Such freedom of movement is facilitated by bearing 76. FIG. 8B shows a cutaway profile of the crosshead and connecting rod interface of FIG. 8A. As can be seen, the connecting rod 46 includes two apertures, the larger of which is engaged about a hub 44 on the crankshaft 40, and the smaller of which fits into the crosshead 54 that reciprocates through guide 57. Employing the pin 75A having a spherical main body 75B, the connecting rod 46 with bearing 76 is free to swivel about the pin 75A, thereby achieving three degrees of rotational freedom in the $R_X$, $R_Y$, and $R_Z$ directions.

Figure 8B:
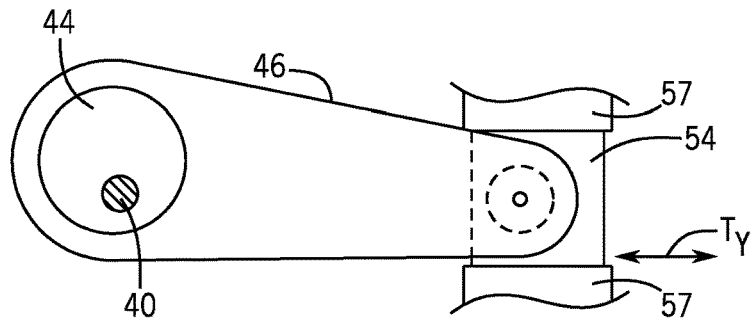
FIG. 8B shows a schematic of the crosshead and connecting rod interface of FIG. 8A in accordance with one or more implementations described herein.

Turning to FIG. 8B, at least two degrees of translational freedom are achieved between the connecting rod 46 and the crosshead guide 57. Translational movement in the direction $T_Y$ is the intentional reciprocating movement of the assembly to move the piston. Keys 66 keep crosshead 54 aligned with guide 57 during reciprocating motion. Returning to FIG. 8A, a gap is defined between the crosshead side plates 54S and bearing 76, providing sufficient freedom in the design for translational movement of the connecting rod 46 within the crosshead 54 in the $T_X$ direction along the X-axis. In some embodiments, the spherical main body 75B may slide along pin 75A when the components are physically separate parts; alternatively, in embodiments in which the spherical main body 75B is integral to pin 75A, the pin 75A may be configured to translate along its axis between side plates 54S.

Figure 8C:
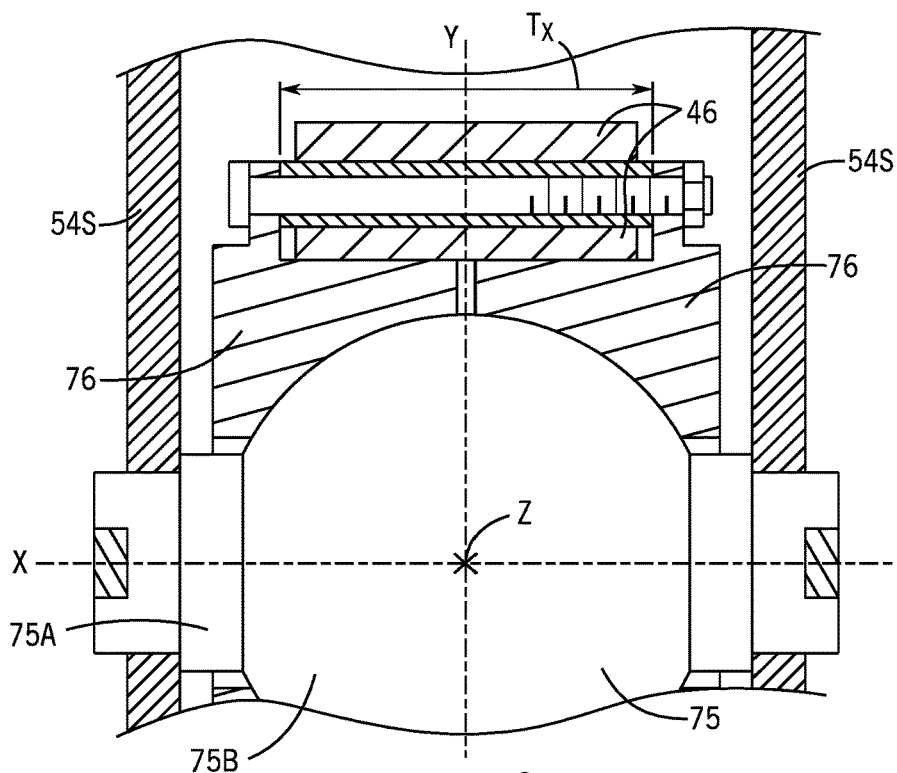
FIG. 8C shows a partial cross-section of a crosshead and connecting rod interface of a mud pump, in accordance with one or more implementations described herein.

Turning to FIG. 8C, another embodiment demonstrating at least two degrees of translational freedom of the connecting rod 46 with respect to the crosshead guide 57 is shown. Separate pieces of bearing 76 can be seen clearly, providing spherical seating for spherical main body 75B of pin 75A. In assembly, pieces of bearing 76 can be fastened about spherical body 75B of pin 75A (e.g., with a fastener extending through tabs of the bearing 76 and the connecting rod 46, as shown at the top of FIG. 8C). Ends of pin 75A are shown engaged with the crosshead side plates 54S. Variable gaps intentionally imposed between bearing 76 and crosshead side plates 54S, as well as between bearing 76 and connecting rod 46, provide sufficient design latitude for incorporating a degree of mechanical give for translational movement of the connecting rod 46 in the $T_X$ direction, as denoted by the double-sided arrow.

Figure 9A:
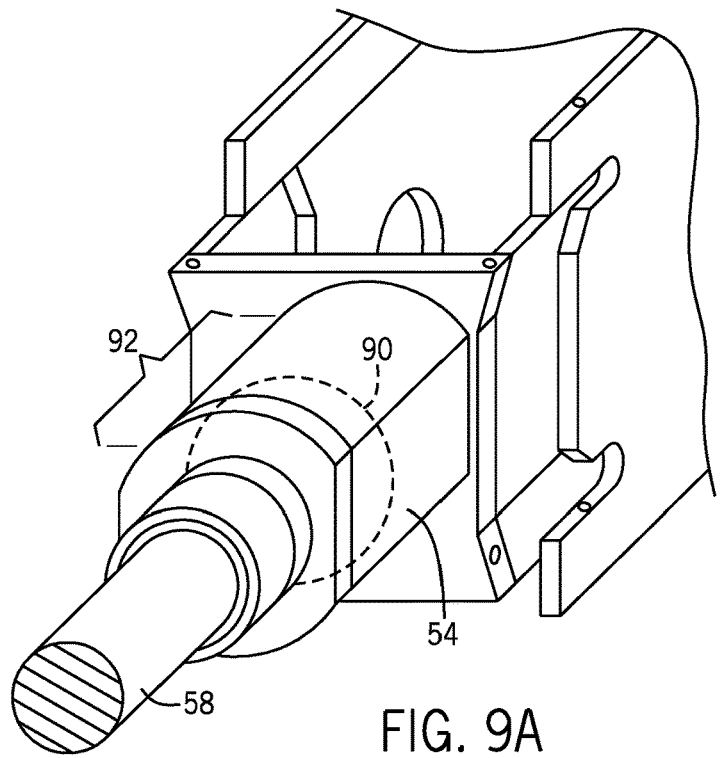
FIG. 9A depicts a piston extending from a crosshead in accordance with one or more implementations described herein.

In a still further embodiment, FIG. 9A shows an illustration of a crosshead and piston interface in accordance with one or more implementations described herein. The end of piston 58 that connects to the crosshead 54 may be formed as a spherical knob. In one embodiment, the spherical knob may be integral to the piston 58; alternatively, the spherical knob may be a separate component fastened to the piston 58. Optionally, the piston 58 may have a sleeve 93 disposed thereon, so as to vary the effective diameter of the piston 58, which will be discussed further below. Turning to FIG. 9A, the knob of piston plunger 58 reciprocates along the Y-axis, forced by movement of crosshead 54, where spherical knob 90 of plunger piston 58 is enclosed in the crosshead 54. FIG. 9B shows a cutaway of the crosshead and piston interface shown in FIG. 9A. A lubrication channel 106 into the interior of the fluid-end side 92 of the crosshead 54 delivers lubricant to the spherical knob 90 of plunger piston 58. A bearing 107 further facilitates rotational movement. In an embodiment, the bearing 107 comprises more than one bearing component having a spherical seat to receive the spherical knob 90 of plunger piston 58, each of the bearing components of bearing 107 being configured to fasten together about the spherical knob 90 of plunger piston 58 in assembly. Thus, five degrees of freedom of movement are provided between the crosshead 54 and the plunger piston 58 in the fluid-end side 92 of the crosshead 54: the plunger piston 58 is able to swivel in three rotational directions with respect to the crosshead due to the spherical knob 90, and translational movement is permitted in the $T_X$ and $T_Z$ directions due to intentional play between the bearing 107 and crosshead housing.

A further improvement upon the mud pump design addresses the issue of seal failure about the piston. In some embodiments of mud pumps, a piston having a moveable sealing head at the fluid end is employed. However, failure of the mud pump occurs when the seal erodes in the harsh working conditions, or when the sealing head fails, such as by breaking off. As an alternative, the present disclosure describes a headless plunger piston having a seal 101 (and optionally sleeve 93) disposed about the piston 58. A variety of means are disclosed for monitoring the seal 101. Additionally, the sleeve 93 may be variable in size depending on the pumping pressure desired in a given application.

Figure 10A:
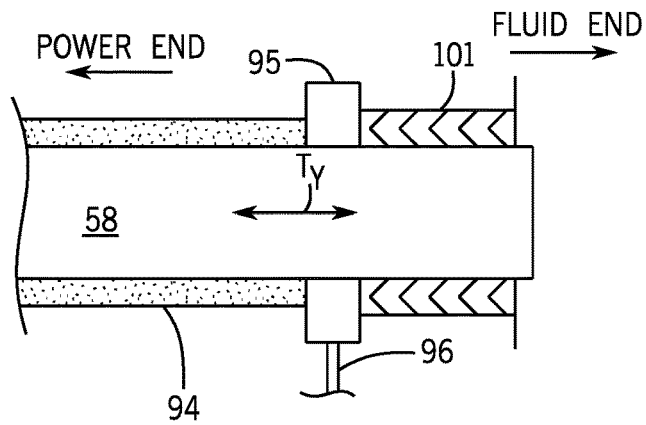
FIGS. 10A-10F depict various embodiments of a plunger piston in various sealing configurations in accordance with one or more implementations described herein.

Turning now to FIG. 10A, plunger piston 58 is shown in detail, with reciprocating motion in the $T_Y$ direction. A directional seal 101 is disposed about the plunger piston 58 on the fluid end. A lubricated pad 94 is provided at the power end of the plunger piston 58, to which oil may be reapplied to lubricate the plunger piston 58. In a cavity 95 defined between the seal 101 and the lubricated pad 94, a drain port 96 may be included so that the quality of the seal 101 at the fluid end can be monitored. As the seal 101 fails, mud will leak in under and around the seal 101, and empty out of the drain port 96.

Figure 10B:
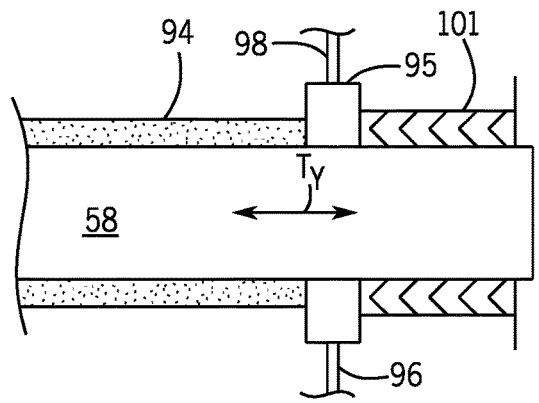

In an alternative embodiment, as shown in FIG. 10B, a lubricated pad 94 is provided at the power end of the plunger piston 58. Similar to as shown in FIG. 10A, in a cavity 95 formed between the seal 101 and the lubricated pad 94, a drain port 96 may be included so that the quality of the seal 101 at the discharge end can be monitored. Additionally, an injection port 98 to the cavity 95 may be provided such that water can be injected into the cavity to flush any leakage mud out of the drain port 96. In an embodiment, the water may be injected at a relatively low pressure. As the seal 101 fails, mud will leak in under and around the seal, and be forcibly flushed by the injected water out of the drain port 96. The injected water also serves to clean and protect the wetted area of the plunger piston 58.

Figure 10C:
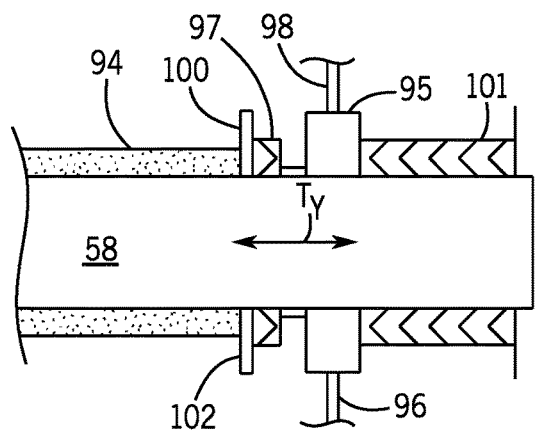

In an alternative embodiment, as shown in FIG. 10C, a lubricated pad 94 is provided at the power end of the plunger piston 58, as in previous embodiments. An oil port 100 allows lubricant to be added, while an oil drain 102 allows lubricant to flush out, keeping the surface of the piston 58 continually renewed with lubricant. This embodiment is also depicted as having a cavity 95, drain port 96 and injection port 98, as described above. The lubricated pad 94 can be optionally isolated from the area where mud leakage may be present by an additional directional seal 97 that is not in contact with the pressurized mud in the fluid end. The flow and temperature of oil lubricant added may or may not be controlled.

Figure 10D:
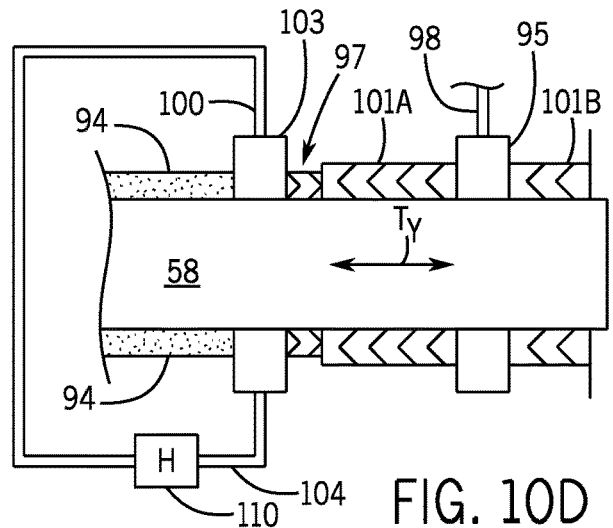

In an alternative embodiment, as shown in FIG. 10D, a lubricated pad 94 is provided at the power end of the plunger piston 58. An oil port 100 allows lubricant to be added through cavity 103 to the lubricated pad 94, while an oil return 104 allows lubricant to circulate, keeping the surface of the plunger piston 58 continually renewed with lubricant. The oil return 104 enables control of the temperature of the lubricant, by inclusion of a heat exchanger 110 to cool the oil. The heat exchanger 110 employed may be of any type familiar to one of ordinary skill in the art. Cavity 95 is defined between seal 101A and an additional directional seal 101B. Additional directional seal 97 prevents oil from entering the fluid end from cavity 103, and mixing with any leaking mud in cavity 95. An injection port 98 to the cavity 95 may be provided such that water can be injected into the cavity 95 to clean the plunger piston 58. In such an embodiment, the water may be injected at a relatively high pressure, in contrast with the low pressure injected water described with respect to FIG. 10C, and forcibly flush leaking fluid from cavity 95. The lubricated pad 94 is thus fluidly isolated from the area around the seal 101 where mud leakage may be present. The embodiment shown in FIG. 10D does not include a drain port 96, but high-pressure water injected into cavity 95 can exit past the seal 101B into the fluid end of the pump.

Figure 10E:
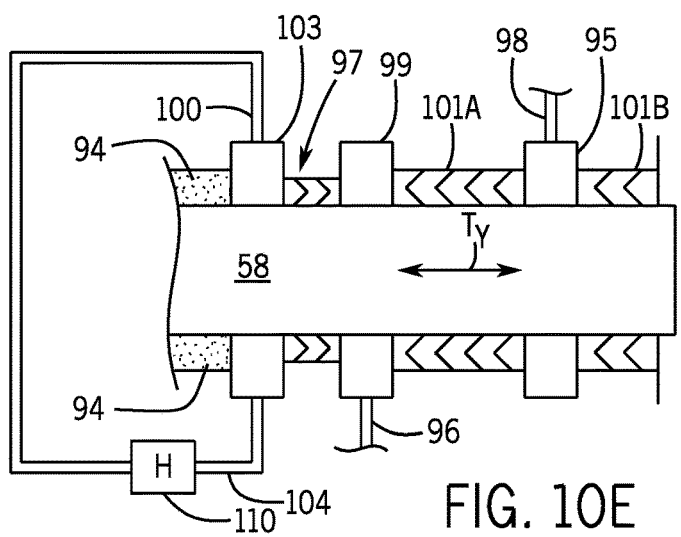

An alternative embodiment, as shown in FIG. 10E, is similar to that shown in FIG. 10D, but also includes a cavity 99 with a drain port 96. The cavity 99 is provided between the end of the seal 101A and the directional seal 97. The drain port 96 allows the quality of the seals 101 to be monitored. Additionally, the injection port 98 and the cavity 95 between the sealing elements 101A and 101B allow water to be injected into the cavity 95, which can aid the directional seal elements such as 101B in the fluid end by providing resistance to mud leaking under the seal 101B from the working space of the pump.

In embodiments including a drain port 96, as the seals 101 fail, mud may leak and be forcibly flushed out of the drain port 96. Injected water also serves to clean and protect the wetted area of the plunger piston 58. When there is no mud particulate in the flow out of the drain port 96, the seal 101 is in good working condition; however, when there is mud particulate in the flow out of the drain port 96, it is indicative that the seal 101 has begun to fail.

Figure 10F:
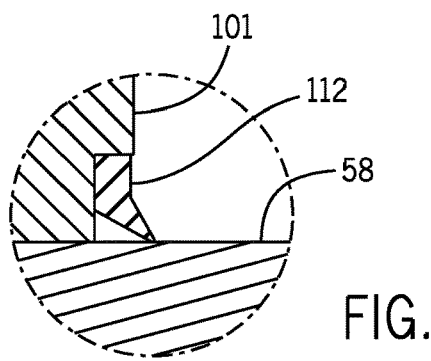

FIG. 10F shows a detailed view of a scraper seal 112 that may be added to the fluid-end side of a seal 101. Scraper seal 112 may be selected from various known geometries of scraper or wiper styles that serve to clean the piston 58 when drawn towards the power-end of the pump.

Additionally, as the plunger piston 58 may be a headless plunger, a sleeve 93 can be disposed about the piston 58. The sleeve 93 may vary in thickness, and be selected to vary the overall effective piston diameter based on desired pressure in the mud pump. The sleeve 93 is disposed about the plunger piston 58 at the fluid end of the plunger piston 58 in fluid communication with the mud. When a sleeve 93 is employed, the seal 101 and lubricating pad 94 are disposed about the sleeve 93 positioned about the piston 58. In each of the embodiments shown in FIGS. 10A-10E, a sleeve 93 can optionally be disposed about the piston to vary piston diameter based on desired pressure in the fluid end of the pump.

Figure 11A:
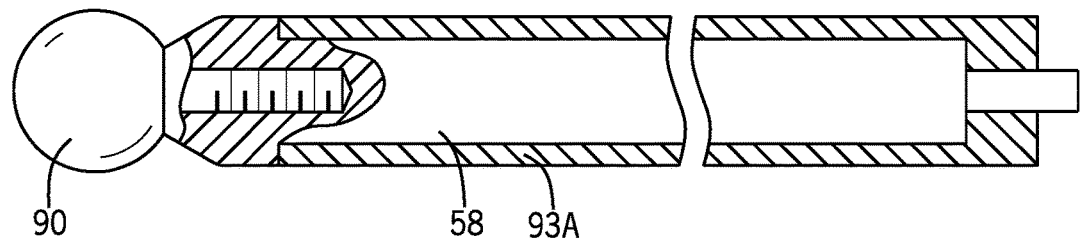
FIGS. 11A and 11B depict a plunger piston in a sleeve in accordance with one or more implementations described herein.
Figure 11B:
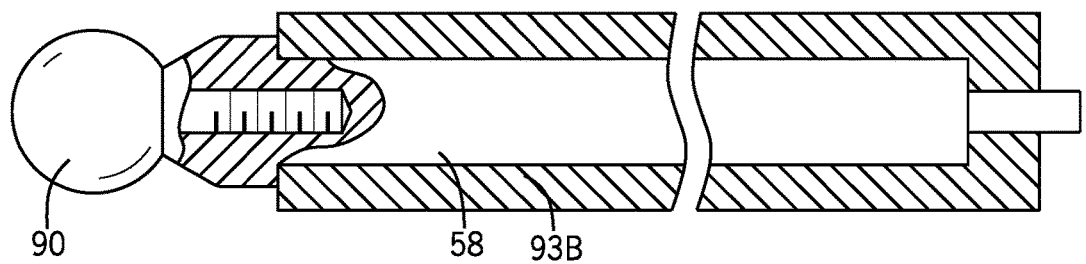

FIG. 11A and FIG. 11B show a piston 58 having a sleeve 93 to manipulate the overall effective diameter of the piston 58. As previously stated, changing the diameter of the piston 58 by the addition of sleeve 93 can allow variation of the pressure in the mud pump. For example, FIG. 11A shows a first sleeve 93A that when in place about the piston 58 produces an overall diameter of 5.5 inches (approximately 14 cm). By comparison, FIG. 11B shows a second sleeve embodiment 93B that when in place about the piston 58 produces an overall diameter of 8 inches (approximately 20 cm).

Figure 12A:
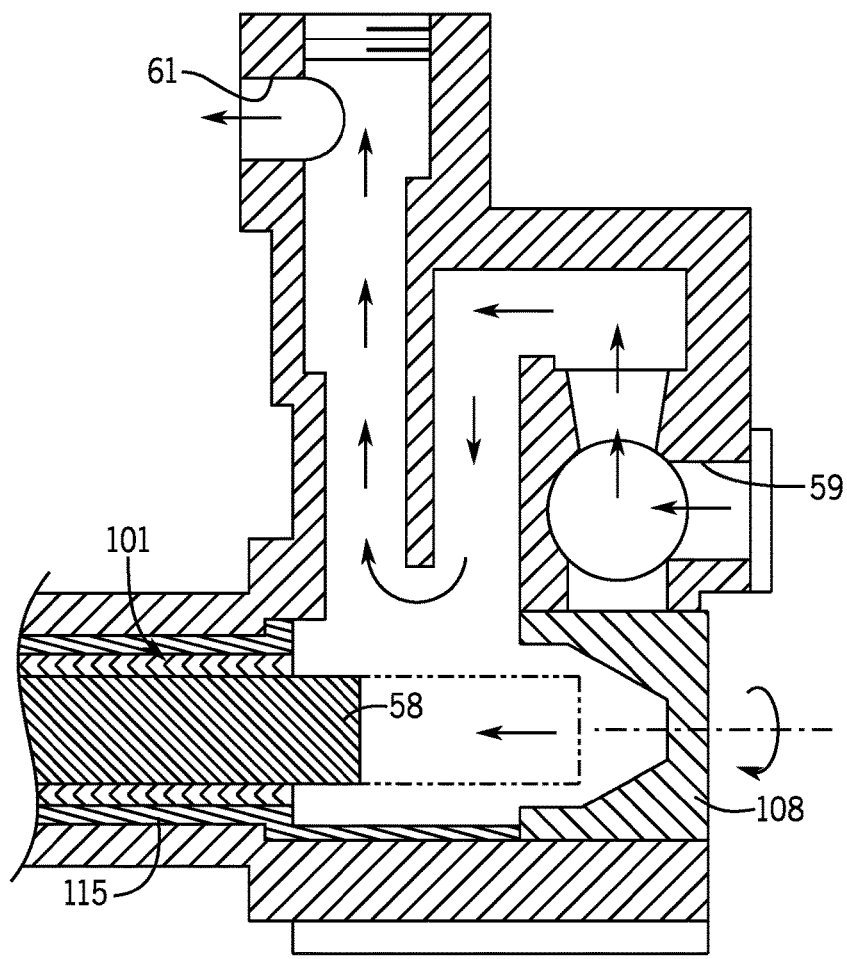
FIGS. 12A and 12B depict a discharge valve in a fluid end of a mud pump in accordance with one or more implementations described herein.
Figure 12B:
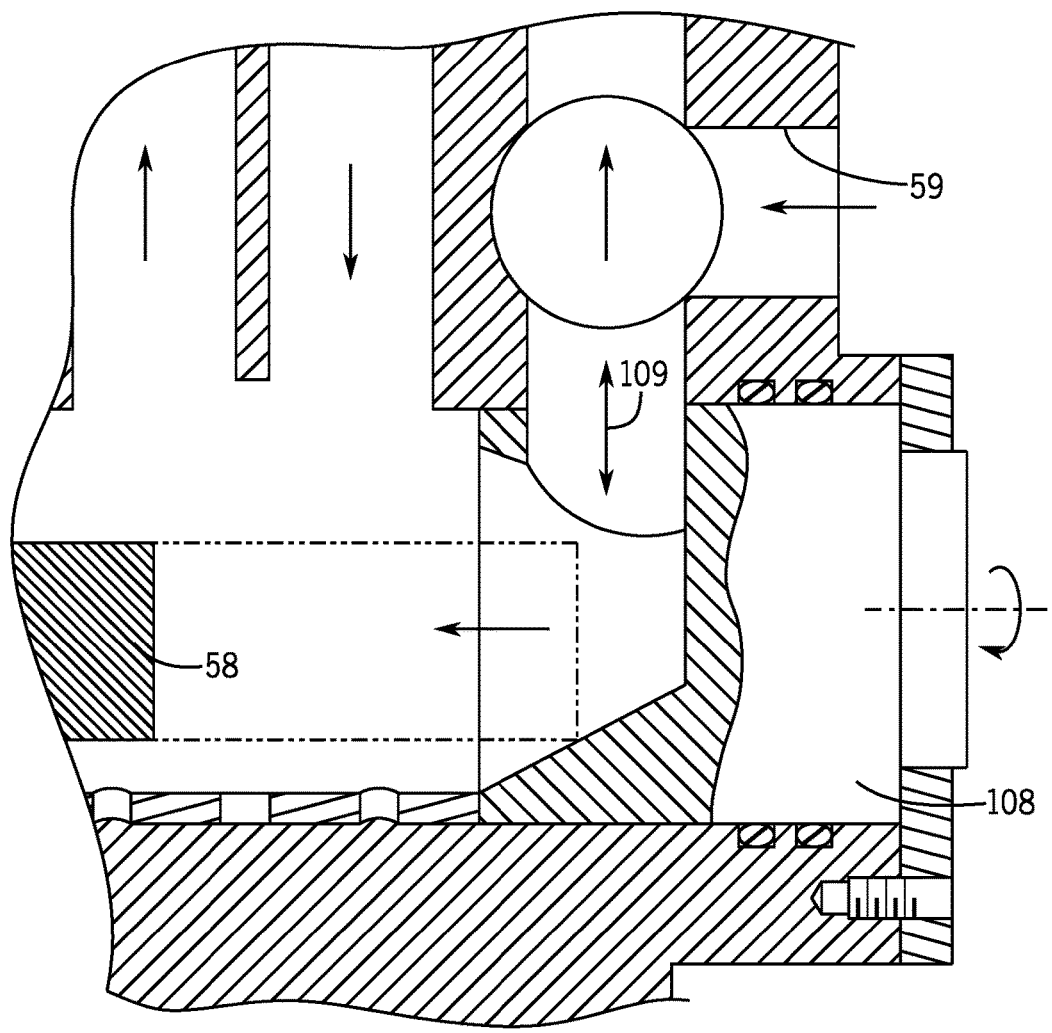

Finally, wear and stress on components of the mud pump can be reduced during start-up of the mud pump. FIG. 12A and FIG. 12B provide schematics of a discharge valve in a fluid end of a mud pump. Without a discharge valve in the fluid end of a mud pump, the pistons are compressing fluid during the start-up of the mud pump, which can create unnecessary overload of the components. In such embodiments, mud pump flow is adjusted by changing the speed of the electrical motor driving the mud pump. By comparison, as can be seen in FIG. 12A, a discharge valve 108 is added to the fluid flow in the fluid end of the mud pump between inlet 59 and outlet 61 (e.g., at the end of a pump liner 115). During start-up of the mud pump, the discharge valve 108 can be opened (for example, by rotation) to provide direct fluid communication between the inlet 59 and the outlet 61. Such free fluid communication reduces the load on components of the mud pump, from electrical motor 31 to piston 58. Additionally, each section of the mud pump can be substantially instantaneously shut down to adjust flow. FIG. 12A shows discharge valve 108 closed with fluid communication blocked indicated by arrow 109. FIG. 12B shows discharge valve 108 open with fluid communication freely flowing indicated at arrow 109.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A self-aligning mud pump apparatus, comprising:
   a housing;
   a rotatable crankshaft disposed in the housing;
   a crosshead disposed in the housing;
   a crosshead guide disposed in the housing to constrain movement of the crosshead; and
   a hub disposed in the housing and disposed on the crankshaft for converting a rotating motion of the crankshaft to a reciprocating motion of the crosshead within the crosshead guide via a connecting rod having a first end coupled to the hub and a second end coupled to the crosshead;
   wherein the connecting rod is coupled to the crosshead via a bearing mounted on a retention component received in a spherical seat such that the second end of the connecting rod pivots in three rotational degrees of freedom within the crosshead and the connecting rod has two translational degrees of freedom with the crosshead guide;
   wherein the retention component is fixedly coupled to a pin, and the pin is moveably coupled to the crosshead so as to allow the pin, along with the retention component, the bearing, and the connecting rod to translate together in a direction perpendicular to the direction of reciprocating motion of the crosshead within the crosshead guide.

2. The mud pump apparatus according to claim 1, wherein play between the bearing and the connecting rod allows the second end of the connecting rod to translate with respect to the bearing in a direction perpendicular to the direction of reciprocating motion of the crosshead within the crosshead guide.

3. The mud pump apparatus according to claim 1, further comprising a plunger piston coupled to the crosshead with five degrees of freedom between the plunger piston and the crosshead.

4. The mud pump apparatus according to claim 3, wherein the five degrees of freedom between the plunger piston and the crosshead include three rotational degrees of freedom and two translational degrees of freedom.

5. The mud pump apparatus according to claim 3, wherein the plunger piston is a headless piston and includes a spherical knob, and the crosshead includes a socket that receives the spherical knob.

6. The mud pump apparatus according to claim 5, comprising a bearing including the socket.

* * * * *